(12) United States Patent
Wang et al.

(10) Patent No.: US 7,190,896 B1
(45) Date of Patent: Mar. 13, 2007

(54) SUPERVISORY CONTROL PLANE OVER WAVELENGTH ROUTED NETWORKS

(75) Inventors: Guo Qiang Q. Wang, Nepean (CA); Yanhe Fan, Nepean (CA)

(73) Assignee: Nortel Networks Limited., St. Laurent (CA)

(*) Notice: Subject to any disclaimer, the term of this patent is extended or adjusted under 35 U.S.C. 154(b) by 0 days.

(21) Appl. No.: 09/563,864

(22) Filed: May 4, 2000

(51) Int. Cl.
*H04B 10/08* (2006.01)
*H04B 17/00* (2006.01)

(52) U.S. Cl. ............................................. 398/30
(58) Field of Classification Search ............... 359/124, 359/110; 370/351, 400; 398/54, 57, 5, 30
See application file for complete search history.

(56) References Cited

U.S. PATENT DOCUMENTS

| | | | | |
|---|---|---|---|---|
| 5,528,406 | A * | 6/1996 | Jeffrey et al. | 398/55 |
| 5,867,289 | A | 2/1999 | Gerstel et al. | 359/110 |
| 5,914,794 | A | 6/1999 | Fee et al. | 359/110 |
| 6,023,730 | A | 2/2000 | Tani | 709/231 |
| 6,160,651 | A * | 12/2000 | Chang et al. | 398/79 |
| 6,718,137 | B1 * | 4/2004 | Chin | 398/3 |
| 6,718,141 | B1 * | 4/2004 | deVette | 398/82 |
| 2001/0033548 | A1 * | 10/2001 | Saleh et al. | 370/218 |
| 2002/0030864 | A1 * | 3/2002 | Chaudhuri et al. | 359/110 |

FOREIGN PATENT DOCUMENTS

EP   0 951 195 A   10/1999

OTHER PUBLICATIONS

M. Veeraraghavan et al., "Internetworking Connectionless and Connection-Oriented Networks", IEEE Communications Magazine, Dec. 1999.*

H. Zang et al., "Connection Management for Wavelength-Routed WDM Networks", Global Telecommunications Conference, IEEE, 1999.*

M. Maeda, "Management and Control of Transparent Optical Networks", IEEE Journal on Selected Areas in Communications, vol. 16, No. 7, Sep. 1998.*

F. Callegati et al., "Packet Optical Networks for High-Speed TCP-IP Backbones", IEEE Communications Magazine, Jan. 1999.*

G. Ferraris, "Management of Optical Networks", ECOC '98, Sep. 20-24, 1998.*

ITU—T Draft Recommendation G.872, "Architecture of Optical Transport Networks," Sep. 1998.

Ghani N. et al: "On IP-Over-WDM Integration" IEEE Communications Magazine, IEEE Service Centre, Piscataway, N.J. US, vol. 38, No. 3, Mar. 2000, pp. 72-84, XP000948526 ISSN: 0163-6804 p. 49, left-hand col., last paragraph *.

Ghani N: "Lambda-Labelling: A Framework for IP-Over-WDM Using MPLS" Optical Networks Magazine, SPIE, Bellingham WA, US. vol. 1, No. 2 Apr. 2000 pp. 45-58, XP000969815 ISSN: 1388-6916, *p. 80, left-hand col., last paragraph—page.

* cited by examiner

*Primary Examiner*—Shi K. Li

(57) ABSTRACT

A dedicated IP-based wavelength routing/signaling control plane for optically switched network, is provided. The IP-based control plane is an out-band routing/signaling mechanism and does not require optical-electrical-optical (OEO) conversion. The control plane can accommodate the various network topologies of the data plane and if one of the supervisory, or control channel fails, the IP-based control plane can re-route the traffic to destination. Using non-broadcasting addressable protocols the control plane selects a different path to re-direct the control information without declaring the whole communications trail down and without affecting the client traffic over the data path.

4 Claims, 2 Drawing Sheets

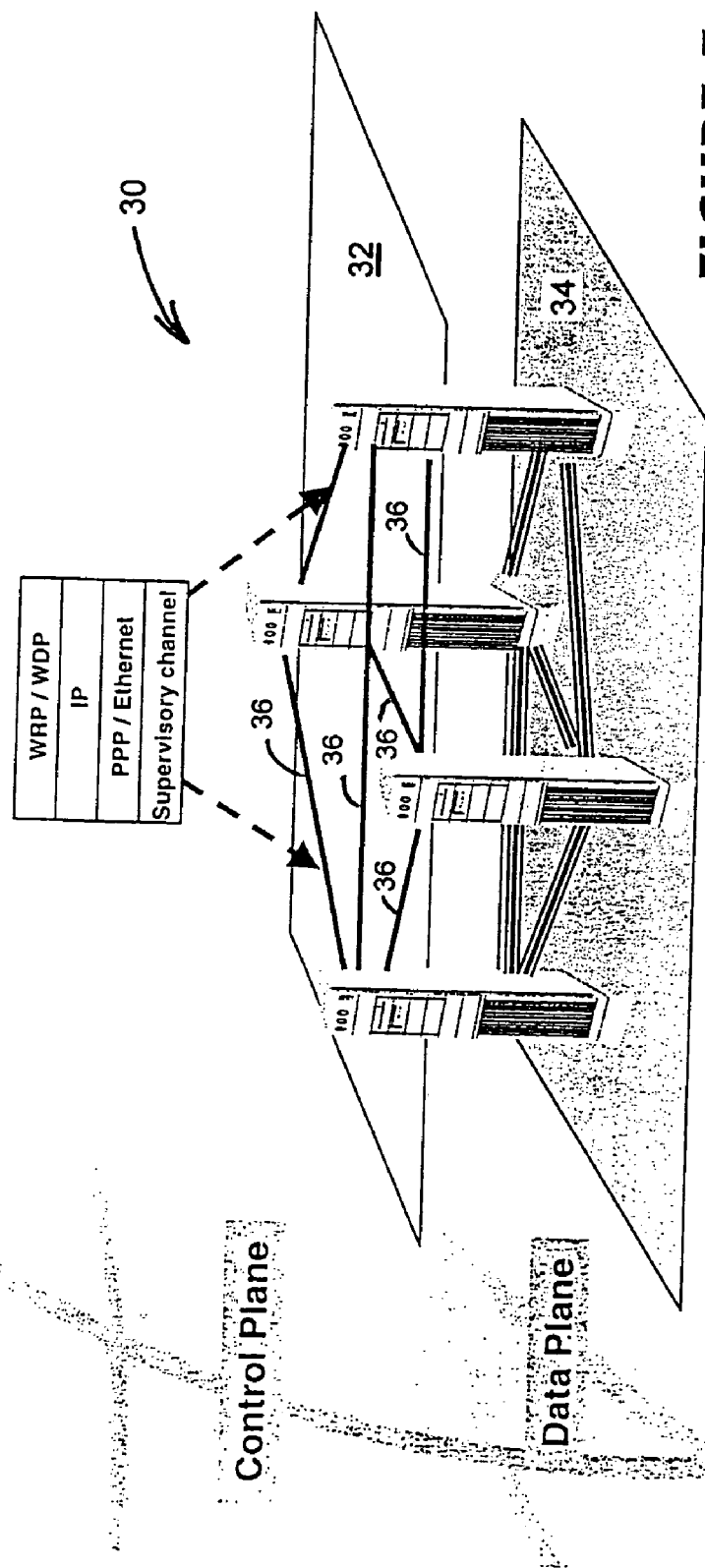

SUPERVISORY CONTROL PLANE OVER WAVELENGTH ROUTED NETWORKS

BACKGROUND OF THE INVENTION

1. Field of Invention

This invention relates in general to supervisory functions in a communications network, and in particular to a dedicated supervisory control plane over wavelength routed networks.

2. Related Art

Optical networks are comprised of functionality providing transport, multiplexing, routing, supervision and survivability of client signals that are predominantly processed in the photonic domain. Generally, the functional architecture of optical networks includes the optical network layered structure, the client/server layer association, the network topology, and the network layer functionality. In the following description, optical signals are characterized by wavelength, or a central frequency, and may be processed per wavelength, or as a wavelength division multiplexed group of wavelengths.

The optical transport network is subdivided into independent transport layer networks where each layer network can be separately positioned in such way so as to reflect the internal structure and functionality of this particular layer network.

The layered structure of the optical transport network is comprised of the optical channel, the optical multiplex section, and the optical transmission section layer networks. The optical layer network provides end-to-end networking of optical channels for transparently conveying client information of varying format. The role of the layer network is to provide the connection arrangement for flexible network routing, the overhead processes for ensuring integrity of the optical channel specific information, as well as the optical channel supervisory functions.

The supervisory channel functions enable network level operations, administration, and maintenance (OAM) functions such as connection provisioning, quality of service (QoS) parameter exchange, optical performance monitoring, and network survivability.

The optical channel layer network provides for transport of digital client signals through an optical channel trail between access points. The characteristic information of an optical channel layer network is composed of two separate and distinct logical signals: a first data stream that constitutes the adapted information of a client layer network (customer traffic), and a second data stream that constitutes the optical channel trail termination overhead (OAM traffic). The channel trail termination overhead provides validation of connectivity integrity, assessment of transmission quality, and transmission of defect detection and indication.

"Lucent Technologies" has proposed the use of a "digital wrapper" (the TDM technology) to process optical overhead information in the digital domain. The TDM overhead information includes an indication regarding the optical performance parameters. This digital wrapper needs Optical-Electrical-Optical conversion and monitoring of the control functions must ne performed at each point of the network where traffic is added or dropped.

The drawback of this approach is the additional costs and limitations added to the implementation of the all-optical, or pure photonic switched network. It also degrades transport transparency of all-optical networking and causes increased interworking complexity for non-TDM traffic such as Gigabit Ethernet and Escon signals.

The optical transport network is designed to support the control functions, or OAM functions. The optical transport network establishes end-to-end communications, or a communications path, and supervises the integrity of network connections along the communications path. The continuity along the communications path is constantly monitored to detect loss of continuity and in the event of a signal within the data layer being interrupted, upstream and downstream network entities along the path are notified. Finally, maintenance indications are required for indicating defects in a connection which is part of the communications path.

The control functions may be used by the network operator to provide routing, grooming, performance monitoring, and/or protection and restoration. The control functions are a network priority because absent this functions there are no communications at all within the network.

Several proposals have been raised to support a control plane comprised of wavelength routing and signaling functions in an optical network. The International Telecommunications Union Working Group 15 Recommendation G872 (ITU WG 15 G872) has defined the optical supervisory channel as point-to-point link between optical transport network elements for OAM purposes. The optical supervisory channel according to ITU WG 15 G872 is a dedicated, point-to-point supervisory channel and there is no build-in routing/signaling control functionality.

The IETF "www.draft-awduche-mpls-te-optical-00.txt" has proposed the use of a separate IP network for routing/signaling control functionality. The separate IP network is needed to support optical layer network routing/signaling of control massages. This separate IP network presents cost, performance, and reliability issues similar to the actual public system telecommunications network (PSTN) signaling network. By using a separate IP network as a wavelength routing/signaling platform, the reliability of the wavelength routing/signaling functions will rely on the reliability of the IP network, which is known as having a low availability.

Accordingly, there is a need for a supervisory control plane over wavelength routed networks capable of providing simple and reliable network-wide control functionality and dynamic wavelength routing and signaling, at an affordable cost while potentially providing truly transparent performance monitoring and OAM functions for supporting all-optical networking.

SUMMARY OF THE INVENTION

It is an object of the present invention to overcome the disadvantages of the prior art associated with the supervisory functions in an all-optical network.

According to one aspect of the invention, a method for out-band routing of control messages over all-optical networks, is provided. The method includes the steps of establishing communications paths for customer traffic in a data plane, each communications path being associated with a dedicated control channel for transmitting control messages, grouping all the dedicated control channels so as to form a supervisory control plane which is logically separated from the data plane, and re-routing the control messages to an alternate control channel using non-broadcasting addressable protocols.

According to the invention, the supervisory network is a dedicated IP-based network to support dynamic wavelength routing and signaling, and potentially supporting optical performance monitoring. If a dedicated supervisory channel fails, the control plane according to the invention can re-route the control and OAM messages via an alternate path without declaring the communications path down, as the data plane is still working fine. Moreover, the IP addressability can be implemented in all control messages for optical routing/signaling protocols, performance monitoring, and OAM functions.

Advantageously, the networking costs and the complexity of the management are greatly reduced, while the reliability of routing/signaling functionality is increased.

The "Summary of the Invention" does not necessarily disclose 4all the features essential for defining the invention. The invention may reside in a sub-combination of the disclosed features.

BRIEF DESCRIPTION OF THE DRAWINGS

The invention will be now explained by way of example only and with reference to the following drawings.

FIG. 3 illustrates an IP-based supervisory control plane over wavelength routed network, according to the invention.

Similar references are used in different figures to denote similar components.

DETAILED DESCRIPTION OF THE PREFERRED EMBODIMENT

The following description is of a preferred embodiment by way of example only and without limitation to combination of features necessary for carrying the invention into effect.

Figure 1:
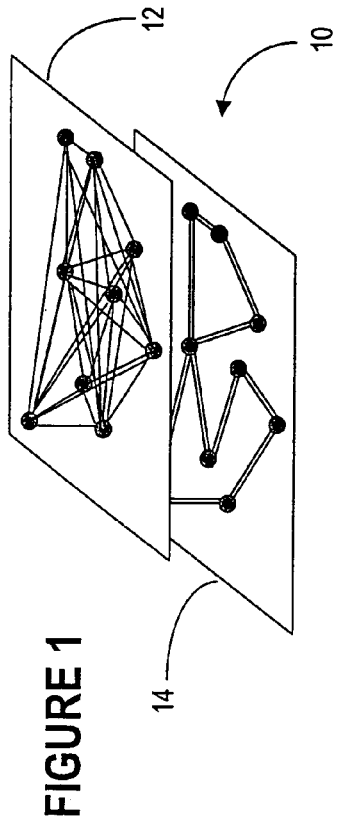
FIG. 1 illustrates the physical and the logical layers of the Optical Internet.

Dense wavelength division multiplexing (DWDM) provides higher capacity, longer reach, and lower cost per bit/mile. A wavelength is and end-to-end optical channel, or circuit of the same frequency from source to destination across a network. FIG. 1 illustrates a network 10 having a physical layer 14 and a logical layer 12. The nodes are illustrated with circles, and the optical network connection, or DWDM spans, are shown in double lines for the physical layer 14 to suggest a plurality of wavelengths (channels), while the control layer connectivity is shown in thin lines for the logical layer 12.

The physical layer 14 provides support for wavelength networking and tends to have thin connectivity relative to higher layers, or the logical layer 12 in the example of FIG. 1. Network 10 may be the Optical Internet which is a simplified and cost effective model, but nevertheless scalable and sufficiently functional. In this case, the physical layer 14 network may be a DWDM optical transport network and the logical network may be an IP network, with data terminals connected at each node. Optical Internet 10 is for example, a fully connected network where each data terminal is connected to the data terminals at all other nodes.

A typical network node of a DWDM network includes the functions of demultiplexing a traffic signal, switching channels of the traffic signal to add and drop local channels, and multiplexing switched channels for transmission. The network node typically includes a controlling unit for operation, administration and maintenance (OAM) functions, an optical demultiplexer, an optical switch, and an optical multiplexer.

Figure 2:
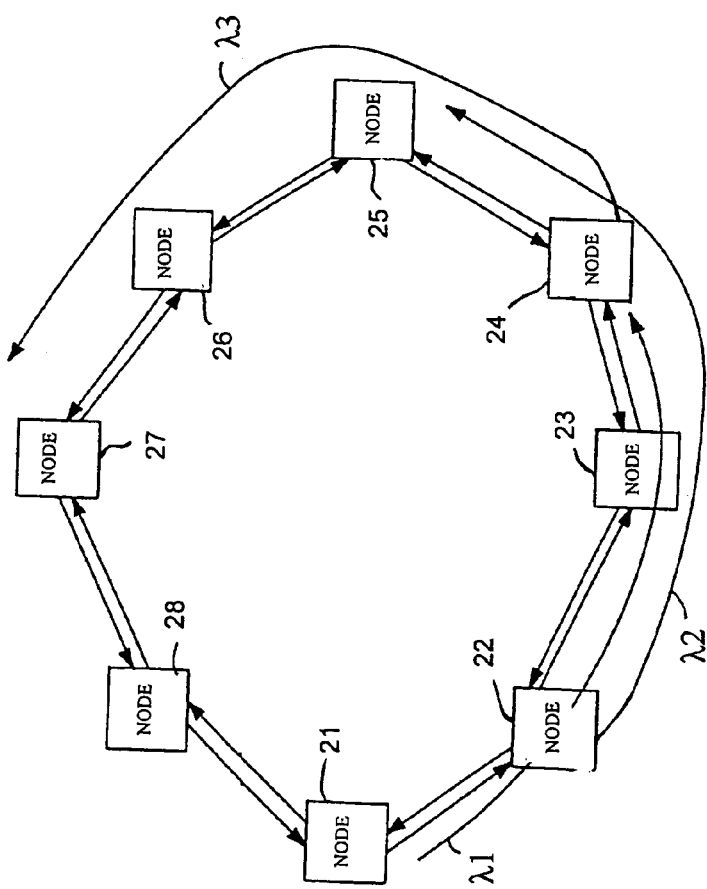
FIG. 2 illustrates a part of an DWDM network showing interconnected nodes.

Multiple optical signals at different wavelengths can coexist in a fiber by using wavelength division multiplexing techniques (WDM). In FIG. 2, the optical signal at wavelength $\lambda 1$ is sent from node 21 to node 24; the optical signal at wavelength $\lambda 2$ is sent from node 22 to node 25; while the optical signal at wavelength $\lambda 3$ is sent from node 24 to node 27. As shown in FIG. 2, two optical signals at different wavelengths share the same fiber segment between nodes 22 and 25, or between nodes 24 and 25.

In general, each optical fiber also carries an optical supervisory channel occupying a wavelength outside the traffic band. The traffic channels carry customer traffic. The supervisory channels carry system administration, signalling, and other overhead traffic hereinafter referred to as OAM traffic.

For satisfying the optical layer network control requirements, a supervisory channel is dedicated to each span in an optical network. The dedicated supervisory channels may be together considered as a separate sub-network which has individual needs, like routing and distribution.

Optical transport network is going toward dynamic routing and signaling networking. As discussed before in connection with FIG. 1, the agile optically switched network 10 is composed of two planes: the physical layer or Date Plane 14 and the logical layer or Control Plane 12. Data Plane 14 comprises DWDM multiple wavelengths to carry the user payload. Control Plane 12 mainly performs wavelength routing and signaling functions.

According to the invention, a dedicated IP-based wavelength routing/signaling control plane for optically switched network which is not part of a separate IP network, is provided. The ITU WG 15 G872 point-to-point supervisory channel is hereby extended to a supervisory network together over the same DWDM network.

The IP-based control plane is an out-band routing/signaling mechanism where the control information is transmitted over control channels which are different from the data channels propagating the client traffic. The out-band routing/signaling mechanism does not require optical-electrical-optical (OEO) conversion for the Data Plane 14. The control plane can accommodate the various network topologies of the data plane and if one of the supervisory, or control channel fails, the IP-based control plane can re-route the traffic to destination using different paths without affecting the client traffic over the data path.

To support the out-band signaling mechanism for a supervisory network, a "non-broadcasting" addressability for optical control messages including: routing and signaling, performance monitoring, and OAM functions is provided according to the invention. Non-broadcasting addressabiliy implies the use of specific destination IP addresses for the control of the IP packets, as opposed to broadcasting the IP addresses to all nodes in the network. The use of a non-broadcasting addressability requires upgrades in the current implementation of the optical routing/signaling protocols, e.g. the wavelength routing protocol (WRP) and the wavelength distribution protocol (WDP).

In all-optical networks, all client traffic is propagated and delivered in an optical, or photonic format, without using OEO conversion. The optical, or photonic switch used in all-optical networks operates in the optical domain only and thus, the transport transparency is not degraded. In addition, the optical switch saves power and can easily be upgraded. The present invention is based on a ITU WG 15 G872 supervisory channel concept extended to a supervisory control network. That is, the optical layer routing/signaling building blocks on each switch, and the plurality of supervisory channels can form an IP-based, dedicated network to support wavelength routing/signaling functions.

As mentioned before, the dedicated supervisory channels may be considered as a separate sub-network which has individual needs, like routing and distribution. One way to rapidly set up wavelengths through a DWDM network in case of a failure of a control channel is to use signaling together with dynamic routing, as described in U.S. patent application "Two stage hybrid logical ring and path protection method for optical switching networks", filed on Mar. 29, 2000 and assigned to the same assignee, which is incorporated herein by reference. Routing is used to collect network topology and resource information regarding the available control channels, and to compute wavelength routes for selecting an alternate control channel. Signaling is used to allocate resources and to setup, maintain and tear down wavelengths associated with the control channels.

To achieve a unified packet in an optical switched network architecture, existing well-defined industry standard routing and signaling protocols may be leveraged together with specific requirements of the wavelength routed network. Alternative protocols may include Open Shortest Path First (OSPF). Intermediate System—Intermediate System (IS—IS), Private Network-Network Interface (PNNI) and Multi-Protocol Label Switching/Label Distribution Protocol (MPLS/LDP). Yet another possible approach is the Signaling System Seven (SS7) which is used in voice networks.

The Wavelength Routing Protocol (WRP) supports routing in optical switched networks, and comprise two main components. First, the protocol obtains the information needed to compute or select wavelength routes. Secondly, wavelength routes capable of meeting a user's type of service request (SLA) are computed, or selected.

The WRP protocol is based on the OSPF protocol, which is a Level-3 routing protocol, with the extensions of wavelength management and information on the status of available wavelengths and interfaces on each link. To support dynamic resources allocation and connectivity provisioning, the major extension in WRP includes new types of Link State Advertisement (LSAs) to distribute availability of wavelengths and interface service information. In addition to topology changes, any other significant change of bandwidth availability, i.e. a change in the number of available wavelengths, would cause this new LSAs to be activated. The WRP protocol may also support non-broadcasting inter-nodal 'Hello' adjacencies to monitor the status of multiple wavelengths over a physical communications link.

The WRP protocol can provide optical network physical level protection and restoration for recovery of a control channel due to link or node failures. The network-wide protection and restoration capabilities of the WRP, which are complementing the optical physical layer linear and ring protection methods, can be used for the restoration of the supervisory network.

The Wavelength Distribution Protocol (WDP) is similar to MPLS/LDP (multi-protocol label switching/label distribution protocol), with the extension of new Type, Length and Value (TV) information, and related procedures. The WDP is a signaling protocol defined to setup, maintain, and release wavelength paths in an optical network. Similar to the LDP, the WDP treats wavelengths as labels. The main function of the WDP is connection management by wavelength grouping and mapping (label banding) according to combinations of destination addresses and service type information, i.e. according to the optical Forwarding Equivalence Classes (FEC). The WDP distributes these label bands with each optical FEC and can create various types of connections, one being the Explicitly Routed (ER) path as defined in the constraint-based routing LDP(CR-LDP) protocol. CR-LDP is believed to be an efficient solution for core network traffic engineering as regards the quality of services (QoS), path optimization, flexibility, and failure recovery.

Physically, a supervisory network 32 is co-located with a payload data plane 34 network on the same DWDM switched network 30, as shown in FIG. 3. Logically we have a separate and dedicated IP network 32 for wavelength control purposes. The Layer-2 framing protocol over this supervisory network 30 could be PPP over SONET, or Gigabit Ethernet, or some other combination such as the Simple Link protocol (SLP) proposed by Lucent over digital wrapper.

As shown before and illustrated in FIG. 3, the point-to-point supervisory channels 36 can topologically be grouped together, and based on the Wavelength Routing Protocol (WRP) and WDP domains, to form the routing/signaling control plane 32 over network 30.

In an optical switch, the supervisory control plane 32 according to the invention can be implemented by adding Layer-2 framing protocol processing over each of the dedicated wavelengths 36 on each DWDM link card which is connected to one fiber. Each of the dedicated wavelengths 36 constitute a "supervisory channel" as defined by ITU WG 15 G872. Accordingly, the Layer-2 framing protocol is running over a dedicated "supervisory channel".

The plurality of point-to-point supervisory channels are considered an IP-based, meshed or ring supervisory network, corresponding to the DWDM topology of the network. Logically, the supervisory network is separated from the DWDM payload, or data plane network. The WRP and WDP protocols, as well as the optical performance monitoring and the OAM protocols will run over the supervisory network to support dynamic wavelength routing and wavelength distribution. As discussed before, all these protocols are non-broadcasting addressable protocols.

The present invention extends the ITU WG 15 G872 supervisory channel concept from point-to-point link to a supervisory network and thus, a supervisory network together with payload data plane over the same DWDM network is created. The supervisory network allows dynamic wavelength routing and signaling. The implementation of the new concept includes combining Layer-2 framing protocol with a dedicated wavelength to form a control plane over a wavelength routed network. The IP-based wavelength routing/signaling control plane of the invention does not depend on a separate IP network. Compared to the separate IP network solution discussed before, the invention provides for a low cost, low management complexity, and highly reliable control plane for DWDM optionally switched network.

Advantageously, if the supervisory channel fails, the control plane can re-route the control messages via an alternate control path to the destination without declaring the whole communications trail down, as long as the payload data plane is still working fine.

Numerous modifications, variations, and adaptations may be made to the particular embodiments of the invention without departing from the scope of the invention which is defined in the claims.

The invention claimed is:

1. A method for out-band routing of control messages to control all-optical networks, comprising the steps of:
    establishing communications paths for customer traffic in an all-optical data plane network, said communications paths being associated with control channels for transmitting control messages over an IP-based, dedicated out-band control plane network, said IP-based, dedicated out-band control plane network being separate from said all-optical data plane network such that a topology of said IP-based, dedicated out-band control plane network is different from a topology of said data plane network, said control plane network including wavelength routing and signaling functions;

mapping said control channels from said IP-based, dedicated out-band control plane network to said all-optical data plane network, including creating a logical association between said topology of said IP-based, dedicated out-band control plane network and said topology of said data plane network; and re-routing said control messages to a destination through an alternative control channel in said IP-based, dedicated out-band control plane network using non-broadcasting addressable protocols.

2. The method of claim 1, wherein said mapping step includes setting up said topology of said IP-based, dedicated out-band control plane network with IP-based Layer-3 routing and signaling protocols, together with Layer-2 framing protocols in said IP-based, dedicated out-band network, and establishing said logical association between said topology of said IP-based, dedicated out-band control plane network and said topology of said all-optical data plane network.

3. The method of claim 1, wherein said non-broadcasting addressable protocols comprising a wavelength routing protocol (WRP) for monitoring the status of wavelengths available on each link of said communications paths, and a wavelength distribution protocol (WDP) performing connections management according to combinations of destination addresses and service type information.

4. The method of claim 3, wherein said wavelength routing protocol (WRP) is activated each time a change occurs in the all-optical network topology and in the bandwidth/wavelength availability.

* * * * *